United States Patent [19]

Cremona

[11] 4,352,488

[45] Oct. 5, 1982

[54] LOG CLAMPING DEVICES USED IN HALF ROUND OR STAY LOG CUTTING

[76] Inventor: Angelo Cremona, Viale Lombardia, 275, 20052 Monza, Italy

[21] Appl. No.: 161,311

[22] Filed: Jun. 20, 1980

[30] Foreign Application Priority Data

Mar. 13, 1980 [IT] Italy ............................ 20574 A/80

[51] Int. Cl.$^3$ ......................... B23Q 1/00; B27B 29/08

[52] U.S. Cl. ............................................. 269/54.2

[58] Field of Search ............................ 269/54.1-54.4; 83/409, 435.1, 707

[56] References Cited

U.S. PATENT DOCUMENTS 3,603,362 6/1981 Neild ................................ 269/54.2

FOREIGN PATENT DOCUMENTS 947645 2/1972 Italy .

*Primary Examiner*—Robert C. Watson

*Attorney, Agent, or Firm*—McGlew and Tuttle

[57] ABSTRACT

A log clamping apparatus for use in holding half round or stay logs in a cutting operation. The apparatus comprises a rectangular bar rotatable about a rotational axis parallel to the major axis of the bar. The bar has at least one fixed toothed element and one moveable toothed element extending from one narrow side of the bar. The toothed elements face each other and are adapted to extend into axial grooves in the log. Shafts are connected on opposite wide sides of the bar and are each connected to toothed dogs. The shafts are rotated by drive means to pivot the dogs to further clamp the log.

7 Claims, 4 Drawing Figures

LOG CLAMPING DEVICES USED IN HALF ROUND OR STAY LOG CUTTING

FIELD OF THE INVENTION

Log clamping devices used in half round or stay log cutting are already well known.

The most valid of these devices consists of a bar of rectangular hollow section, which is capable of being rotated about an axis which is parallel to the major axis of bar. The bar has two rows of teeth, one row fixed on the upper side of the bar and the other row consisting of the toothed ends of a series of jaws pivoted inside the bar, which project and face the row of fixed teeth through a series of slits.

Both these rows of teeth engage slots cut in the bottom of the log so as to firmly secure the log to the bar (serving to rotate the log) each time the movable teeth are thrusted by means of springs towards the row of fixed teeth, and they release the log from the bar when a flexible tube located inside the bar is inflated thereby opposing the action of the springs.

The action exerted by such devices can be dangerously insufficient when a knife for slicing pieces from the log, acts with a large lever arm force.

In order to remedy this drawback, this application proposes means to supplement the above described devices, consisting of two shafts parallel to the log bar axis, each shaft being located along one of the two sides of the bar, perpendicular to the log resting plane, and to which are fitted two or more dogs provided with toothed ends to grip the log. The axis of said shafts is displaced towards the log with respect to the bar center line.

The dogs are all of the same length, and are designed to grip the outer profile of the log over an arc whose length is greater, the greater is the log cross section.

The dogs are designed so as to be easily extended by means of other similar toothed dogs which can be fastened to the former by means of a screw.

DESCRIPTION OF THE PRIOR ART

As is already known, half round cutting is frequently used in industry to obtain thin sheets known as "veneers" from logs or parts of logs of valuable wood.

The operation essentially consists of rotating the log eccentrically about a horizontal axis, and cutting for each revolution a sheet by means of a knife extending parallel to the axis of rotation, which is provided with radial approach movement towards said axis.

There already exist devices normally provided on rotary veneer lathes, which permit securing the log to a mechanical system in order to rotate the log in such a manner so as to withstand the appreciable stress generated by the knife cutting action on the log.

One of the most frequently used and efficient devices is the one protected by Italian Pat. No. 947,645 granted to the present applicant.

This device essentially consists of a bar which is of rectangular hollow section, rotating parallel to the axis of rotation, and which is provided with two rows of teeth. One of these rows of teeth is fixed on one side of the bar, while the other row consists of the toothed ends of a series of jaws located inside the bar, which protrude through slits to face the first row of teeth on the same side of the bar.

The jaws are pivoted inside the bar and their toothed ends are thrusted by springs towards the row of fixed teeth so as to clamp the log on the two parts via the slots (in which they had been previously inserted) thereby firmly attaching the log to the bar used for log rotation.

To release the log from the bar, a flexible and inflatable tube is provided. This tube is also located inside the bar, and, when inflated, it opposes the spring action, thereby retracting the movable teeth from the fixed teeth.

The applicant has found that such a device has in actual fact certain limitations, above all owing to the fact that said oscillating jaws, being incorporated inside the bar, are necessarily rather close to the fixed teeth, and therefore the two parts act between one another with a relatively short lever arm forces as compared to that with which the knife acts on the log, consequently their clamping action can sometimes prove insufficient.

On the other hand, the distance between the two rows of teeth cannot be appreciably increased if not by increasing the bar cross sectional dimensions; this would be irrational as it would limit the operational capabilities of the machine in that the knife would have less possibility of approaching the axis of rotation.

In order to remedy this difficulty, the applicant has now devised an improvement to which this invention relates.

SUMMARY OF THE INVENTION

The improvement essentially consists of a second device which supplements the one described above, by operating simultaneously with it in the initial half round cutting operation when the knife is acting with a large lever arm force and when the first device could therefore exert an insufficient clamping action; it is then disengaged (either mechanically or automatically) when the knife closely approaches the axis of rotation, therefore acting with a small lever arm force, and consequently the clamping effect of the already known device is more than adequate.

The device in accordance with the present invention consists above all of two shafts parallel to the axis of the log holder bar. Each one of these shafts is arranged on one of the two sides of said bar perpendicular to the resting plane of the log from which protrude toothed elements of the first, above described device; two or more dogs with toothed ends for log gripping are fitted on both of these shafts.

The device is also characterized by the fact that said dogs all have the same length, and the shafts on which they are fitted are arranged so that their axis is displaced towards the log with respect to the bar cross section center line. As a result, when the dogs are in their operating position, that is with the toothed ends in contact with the log, they perform their gripping action at a point as near as possible to that point where the knife bites into the log, while when they are in the rest position, that is alongside the wall of the bar, they are contained within the overall radius of the bar cross section, hence they do not limit the knife action.

Another characteristic of the toothed dogs is that they can rotate about the axes of the shafts on which they are fitted hence they can grip the outer profile of the log over an arc (defined by the relative distance between the two opposing rows of teeth) the length of which increases, the greater is the log cross section; hence they are capable of exerting a clamping action which is to a certain degree proportional to requirements. This is not true of the toothed elements of the already known device which, instead, always grip the log over the same arc.

Hence when these toothed dogs are in the operating position they can, for all intents and purposes, completely replace, with more reliable clamping, the action of the already known device, whose intervention is only required when mounting the log on the bar to ensure its rigid fastening in position, and also in the final veneer cutting stage, when the knife, by now close to the axis of rotation, would interfere with the toothed dogs, which must therefore be disengaged.

A fourth characteristic of the device in accordance with the invention consists of the fact that the teeth of these dogs also are of such a profile as to enable them, when biting into the sides of the log, to push the log against the plane of the bar on which it rests, hence establishing a preloading action which opposes the tendency of the log to be detached from the bar through the knife cutting action.

A fifth characteristic of the device in accordance with the invention consists of the fact that each dog is designed to be easily extended by means of another similar toothed dog, whose form can be adapted to the log cross sectional profile, and where said extension member can be rapidly fitted to its respective dog preferably by means of just one clamping screw.

A sixth and last characteristic of the device in accordance with the invention consists in providing clamps as means of fastening said dogs on to the relative shafts, wherein said clamps are fastened by screws which are perpendicular and eccentric with respect to the shaft axis, and hence capable of forming a torsional connection by friction between the dogs and shafts. This arrangement is a means of limiting stress set up in the event of accidental overloading of the dogs.

A preferred embodiment of the device of the present invention is illustrated in the accompanying drawings which is to be considered as an exemplification of the principles of the invention and is not intended to limit the invention to the embodiment illustrated.

DESCRIPTION OF THE PREFERRED EMBODIMENT

Figure 1:
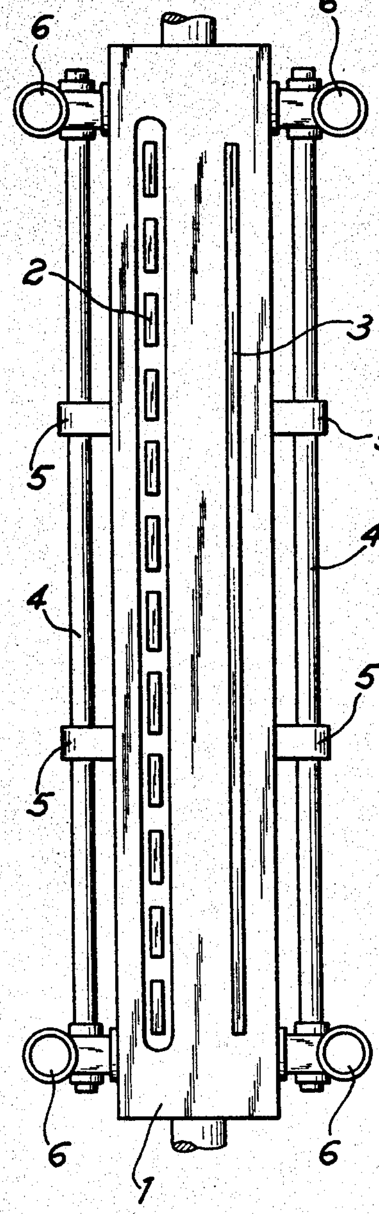
FIG. 1 is a front view of the log holder bar.

As can be seen in the drawings (FIG. 1), the log holder bar 1, besides incorporating movable toothed elements 2 rotatable about a shaft 22, and fixed toothed elements 3 of the already known device, also has shaft 4, with relative bearings 5 and rotary driving means 6. Elements 2 and 3 extend into axial grooves 26 of the log and clamp the log to the bar.

The latter means preferably consist of non reversible geared motors (given schematically in the figure) to whose output shafts are connected the shafts carrying the clamping dogs.

Figure 2A:
FIG. 2*a* is cross sectional view of a detail of a tooth of the device in accordance with the invention.
Figure 2:
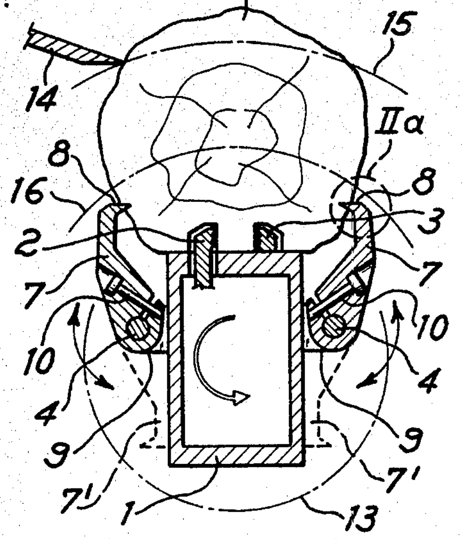
FIG. 2 is a cross sectional view of the bar with the device in accordance with the invention where the dogs are not provided with extension members.

In FIG. 2 there is a cross sectional view of the log holder bar 1, to which is fastened log T, as well as a pair of toothed dogs 7, provided with log gripping teeth 8, fitted to shafts 4.

As shown in detail in FIG. 2*a*, the log gripping tooth 8 at the end of dog 7 has flat and converging flanks, of which the upper flank 8*a* is directly tangential to the approach trajectory of tooth 8 to log T, while the lower flank 8*b* slopes so as to face both the log and the side of bar 1 to which the log is fastened. When tooth 8 bites into log T, the resultant of the thrusts exerted on the wood from flanks 8*a* and 8*b* is directed towards the above mentioned side of bar 1 against which the log T, at its flat cut support surface 24, will therefore by preloaded.

Toothed dogs 7, as stated before, rotate about shafts 4 and they can be clamped to these shafts by means of slotted hubs 9 through tightening screws 10.

Dogs 7 (indicated in this case with the dashed lines as 7'), when in the rest position, completely fall within the overall bar cross section circumference 13.

Hence during the half round cutting operation, the device in accordance with the invention is used over almost the entire height of the log, with the already known device being used over the last part. This is particularly clear from FIG. 2 which shows knife 14 biting into the log along an arc 15 during the initial cutting phase, and along an arc 16 in the limit beyond which the dogs 7 are brought to their rest position 7' in order to continue and finish the veneer cutting operating by using just the known clamping elements 2 and 3.

This sequence may also be performed automatically without interrupting the log cutting process.

Figure 3:
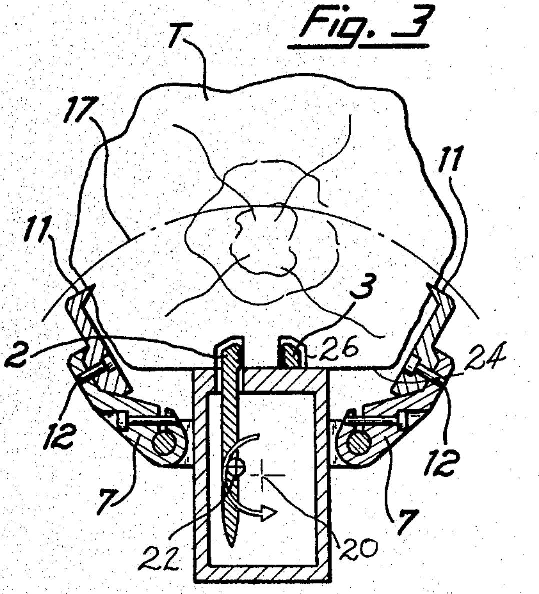
FIG. 3 is analogous to FIG. 2 but illustrates the dogs provided with extension members.

FIG. 3 shows, as does FIG. 2, the same cross section of bar 1 on to which is fixed log T, with dogs 7 in their operating position; the latter, however, are provided with extension members 11 which are fitted to the dogs by means of screws 12. Arc 17 shown in the figure represents the limit beyond which it is no longer possible to use the extension dogs 11; hence machine operation must be interrupted at this point, and said extension dogs 11 removed by loosening screws 12; machine operation is then resumed with just dogs 7 directly gripping the log.

The foregoing disclosures and descriptions represent, as already stated, a preferred embodiment of the invention. They are to be considered as an exemplification of the principles of the invention and are not intended to limit the invention.

To a person skilled in the art, it will be observed that numerous variations and modifications may be effected all, however, falling within the scope of the invention.

I claim:

1. A log clamping device for use in half round or stay log cutting of logs having a support surface and a pair of axial grooves in the support surface, comprising:

a rectangular cross-sectioned bar having two wide sides and two narrow sides, rotatable about a rotation axis which is parallel to a a major axis of the bar;

at least one fixed toothed element extending from one narrow side of said bar;

at least one movable toothed element movably mounted to said bar extending from one narrow side at a location spaced from said toothed element, each of said fixed and movable elements having teeth facing each other and adapted to extend into respective axial grooves of a log with the log supporting surface supported on said one narrow side, said movable element movable to reduce the spacing between teeth on said fixed and movable elements to clamp the log to said bar;

a shaft connected to each wide side of said bar extending parallel to said rotation axis and disposed between said rotation axis and a plane containing said one narrow side;

at least two toothed dogs connected to each shaft, each having a length so as not to extend beyond the other of said narrow sides with said dogs pivoted about said shaft against each respective wide side and away from said plane containing said one narrow side; and drive means connected to said shafts for rotating said shafts and moving said toothed dogs into engagement with the log clamped to said bar, to further clamp the log to said bar, and for moving said toothed dogs against their respective wide sides;

each toothed dog having a log engaging tooth which is wedge-shaped and inclined so as to draw the support surface of the log firmer into engagement with said one narrow side, with increased engaging force between each dog tooth and the log.

2. A log clamping device according to claim 1, wherein each dog tooth includes a top flat flank extending substantially tangentially to a path of motion of a dog carrying said dog tooth, and a bottom flat flank inclined with respect to said path of motion and meeting said top flat flank at an engagement edge for engaging a log.

3. A log clamping device according to claim 1, wherein each of said toothed dogs is equal in length, said bar, when it is rotated, defining an outer cross-section circumference, said toothed dogs having a length so that, with each toothed dog moved away from said plane containing said one narrow side and against an associated wide side thereof, each toothed dog is within said cross-section circumference.

4. A log clamping device according to claim 1, wherein said drive means can hold each of said toothed dogs fixed at different operating positions and engaged with a log, in which operating positions each toothed dog can be locked in order to enable said toothed dogs to hold the log over an arc which is greater, the greater the log cross section.

5. A log clamping device according to claim 1, including an extension member connected to each toothed dog having an extension member tooth substantially similar in shape to the tooth of its connected toothed dog.

6. A log clamping device according to claim 5, wherein an inner surface of each toothed dog substantially corresponds to an outer surface of each extension member, said inner surface mated to said outer surface with said extension member connected and a screw extending through said mated inner and outer surfaces for connecting said extension member to each respective toothed dog.

7. A log clamping device according to claim 1, wherein each toothed dog includes a slotted hub portion with an opening therein for receiving a respective one of said shafts and a screw extending across a slot in said slotted hub and spaced from a central axis of said shaft for clamping said toothed dog to its respective shaft by friction.

* * * * *